(12) United States Patent
Todasco

(10) Patent No.: US 11,269,581 B2
(45) Date of Patent: Mar. 8, 2022

(54) PRIVATE VIRTUAL OBJECT HANDLING

(71) Applicant: PAYPAL, INC., San Jose, CA (US)

(72) Inventor: Michael Charles Todasco, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/298,328

(22) Filed: Mar. 11, 2019

(65) Prior Publication Data
US 2019/0272139 A1 Sep. 5, 2019

Related U.S. Application Data

(63) Continuation of application No. 14/925,898, filed on Oct. 28, 2015, now Pat. No. 10,228,893.

(51) Int. Cl.
| | |
|---|---|
| *G06F 3/048* | (2013.01) |
| *G06F 3/14* | (2006.01) |
| *G06T 19/00* | (2011.01) |
| *G06F 21/62* | (2013.01) |
| *G06Q 20/10* | (2012.01) |
| *G06F 3/147* | (2006.01) |
| *G06F 21/10* | (2013.01) |
| *G06Q 20/06* | (2012.01) |
| *G06Q 20/14* | (2012.01) |
| *G06Q 20/32* | (2012.01) |
| *G06Q 20/34* | (2012.01) |

(52) U.S. Cl.
CPC ............ *G06F 3/1454* (2013.01); *G06F 3/147* (2013.01); *G06F 21/10* (2013.01); *G06F 21/6209* (2013.01); *G06Q 20/0655* (2013.01); *G06Q 20/10* (2013.01); *G06Q 20/14* (2013.01); *G06Q 20/3224* (2013.01); *G06Q 20/351* (2013.01); *G06T 19/006* (2013.01); *G06F 2221/2111* (2013.01); *G06T 2219/024* (2013.01)

(58) Field of Classification Search
None
See application file for complete search history.

(56) References Cited

U.S. PATENT DOCUMENTS

| | | | |
|---|---|---|---|
| 9,007,422 B1 | 4/2015 | Kwon et al. | |
| 2008/0228607 A1* | 9/2008 | Jung | ............... G06Q 40/12 705/30 |
| 2014/0129354 A1* | 5/2014 | Soon-Shiong | ....... G06Q 10/087 705/16 |
| 2014/0287779 A1 | 9/2014 | O'Keefe et al. | |
| 2014/0368534 A1* | 12/2014 | Salter | ............... G06T 19/006 345/619 |
| 2015/0097865 A1* | 4/2015 | Subramanian | ......... G06T 11/60 345/633 |
| 2017/0021273 A1* | 1/2017 | Rios | ............... A63F 13/216 |
| 2017/0052676 A1 | 2/2017 | Puller et al. | |

\* cited by examiner

*Primary Examiner* — Thanh T Vu
(74) *Attorney, Agent, or Firm* — Haynes and Boone, LLP

(57) ABSTRACT

A system and method allows for a virtual object to be privately shared, exchanged, and/or viewed. The virtual object is associated with a real world location and may be viewed through a user device as part of a virtual reality and/or augmented reality world.

20 Claims, 7 Drawing Sheets

PRIVATE VIRTUAL OBJECT HANDLING

CROSS-REFERENCE TO RELATED APPLICATIONS

This application is a continuation of U.S. patent application Ser. No. 14/925,898, filed Oct. 28, 2015, which is herein incorporated by reference in its entirety.

TECHNICAL FIELD

The present disclosure generally relates to systems and methods for manipulating virtual and augmented reality objects and more particularly privatizing virtual and augmented reality objects to designated users.

BACKGROUND

Virtual and augmented reality, at the moment, is a very exciting and new experience. Vast artificial worlds can be created for individuals to interact with and view. In some cases, immersive gamming or cinematic experiences can be created using virtual and augmented reality. In other cases, virtual and augmented reality can be used to aid individuals in everyday life by providing helpful information to the individuals.

However, virtual and augmented reality technology tends to encourage antisocial behavior. Most virtual and augmented reality systems are used in a very private manner. Outside of cooperative gaming, virtual reality and augmented reality disconnects users from the real world and the people that surround them. Similar to how many people are oblivious to the world around them when their heads are buried into their smartphones, virtual and augmented reality has the propensity to further disconnect people from the real world and people around them.

Therefore, it would beneficial to have a system and method that encourages real world intimate interactions between individuals using virtual and augmented reality.

Figure 1:
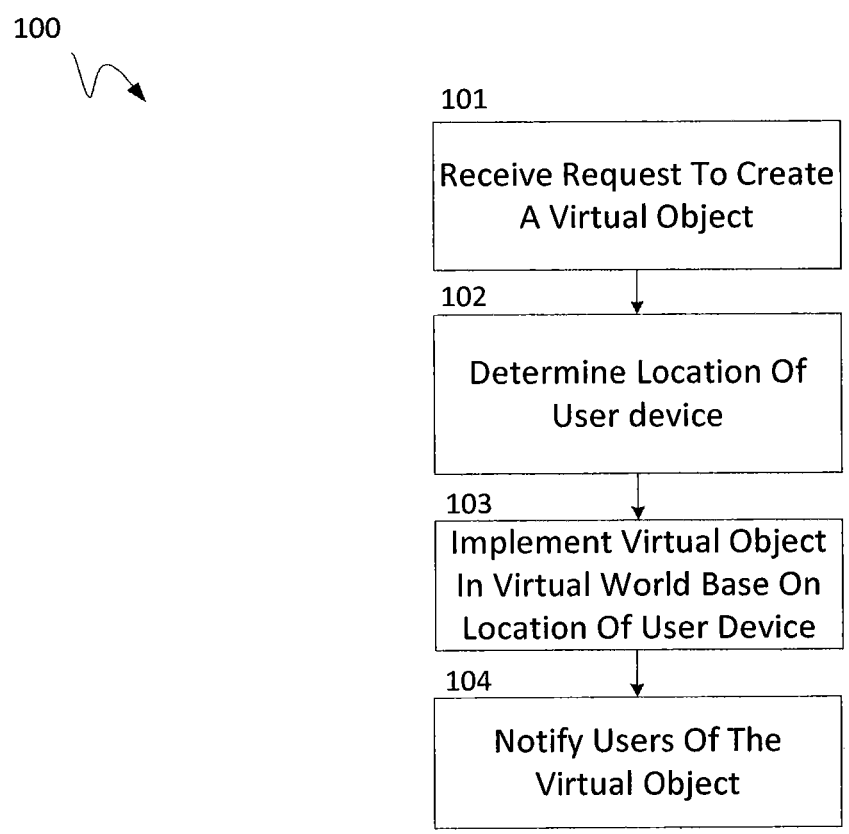
FIG. 1 is a flow diagram illustrating exemplary processes for creating a virtual object.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some embodiments, a system and method allow for a user to create a virtual object and associate the virtual object with a real world location. The user may also associate the virtual object with one or more accounts, such that other users with devices registered to the associated accounts may interact with the virtual object. Examples of interaction include, but are not limited to, moving, exchanging owning, viewing, editing settings, adding notes, and/or the like. In this manner, virtual objects may be set such that only designated users may view the virtual object through one or more displays of one or more devices.

As such, a virtual object may be shared between the creator and designated users, but other non-designated users may not be able to interact with the virtual object or even know it exists. Furthermore, the virtual object may create an intimate relationship between the creator and the one or more designated users. As an example, a creator may create a virtual note designated to one or more users and place it in a virtual world that maps to a public real world location. The designated note may be invisible to users and/or devices that the note is not designated to. However, to the designated user, the virtual object may be visible through a device registered to the user. The user may be able to take possession of the virtual object. The virtual object may also be visible to the creator. In some embodiments, the virtual object may appear as a virtual badge over the creator and/or designated user's device such that the creator and/or designated user may be able to recognize each other. The badge may serve as an indicator to help users recognize other users who they have some connection with from a crowd.

In some examples, the virtual object may be a virtual representation of currency that may be tied to real currency. The virtual currency, like the virtual object discussed above, may have designated users that may interact with the virtual currency. In this manner, another user, such as the creator, can leave the virtual currency for another user without worry of someone else stealing the virtual currency. This may be beneficial in tipping situations to ensure a certain waiter receives the tip. Additionally, tipping in this manner has advantages over a user simply crediting the currency value to another individual because a real world experience is attached to the acceptance of the tip. In this manner, the tipper has the opportunity to create a personal connection with the recipient beyond an accumulated tip amount at the end of a shift, which may be pooled with other tips and recipients. The waiter would experience picking up the check from a certain table identified with the tipper and the tipper may be able to leave a note. As such, secure tipping using virtual and augmented reality may be conducted while maintaining the general experience of receiving a tip. In some examples, a tally of the tip amounts given by a patron may be displayed over the patron as part of the augmented reality. This way, a waiter may be able to identify regular and/or repeat customers or ones that typically tip well or not.

In some examples, the virtual object may be a private note with private information, such as a phone number. A user may be able to leave the virtual note in a public area that may be viewed by an individual that is designated by the user.

In some embodiments, a computer implemented method for enabling private exchange of a virtual object includes receiving, from a first device, location data, a request to place a virtual object, and a first and second account identifier. The method may include determining a first geo-location of the first device from the location data, generating the virtual object and associating the virtual object with the first and second account identifier, and enabling a second device associated with the second account identifier to display the virtual object in response to associating the virtual object with the second account identifier.

In some embodiments, a private virtual object exchange system comprises a non-transitory memory storing instructions and one or more processors coupled to the non-transitory memory and configured to read the instructions from the non-transitory memory. The instruction may cause the system to perform operations such as receiving a location of a device, determining a virtual object associated with the first device is within a predetermined distance from the location of the device, sending a 3-D model of the virtual object to the first device in response to the determination, receiving from the device a user input indicating a selection of the virtual object, and transferring ownership of the virtual object to a first account associated with the first device.

In some embodiments, a non-transitory machine readable medium has stored thereon machine readable instructions executable to cause a machine to perform operations such as creating a virtual object that is displayable on one or more electronic displays when detected, the detectability of the virtual object depending on a permission setting of the virtual object, receiving from a user device a first location data, determining that the first location is within a threshold distance from a second location of the virtual object, determining that the user device has permission to detect the virtual object based on the permission setting, and causing the user device to render the virtual object in response to determining that the user device has permission to detect the virtual object.

FIG. 1 is a flow diagram illustrating exemplary processes 100 that may be implemented by a system to for creating a virtual object according to some embodiments. In some examples, the system may include one or more remote servers orchestrating the placement, visibility, creation, settings, and interactions of user devices with virtual objects through a network connection. According to some embodiments, processes 100 may include one or more of the processes 101-104 which may be implemented, at least in part, in the form of executable code stored on a non-transitory, tangible, machine readable media that, when run on one or more processors, may cause the one or more processors to perform one or more of the processes 101-104.

At process 101, the system may receive from a first user device a request to create a virtual object. The user device may provide one or more interfaces for creating, manipulating, and/or interacting with a virtual object. The request may be received over a network, such as the Internet. The system may also receive other information either as part of the request, along with the request, or separately. The other information may include information such as, time/date, device identifier, virtual object designations, virtual object settings, device location information and/or the like. In some examples, one or more user devices may continuously provide and/or update the system with one or more of the other information, such as device location information and time.

In some embodiments, the request may be accompanied by settings associated with the virtual device. In some examples the settings may include a selection of a 3-D model for the virtual object. In some examples, the settings may be a user created 3-D model for the virtual object. Other settings may include user specified predetermined actions to occur upon certain interactions with the virtual object. For example, the virtual object may have a passcode and/or a puzzle that, when solved, causes the virtual object to conduct a certain action, such as an animation, transfer of ownership, transfer of monetary funds, and/or the like. In some examples, the virtual object may transfer currency from an account associated with the first user device to an account registered with a second user device when the second user device interacts with the virtual in some way, takes possession of the virtual object, and/or comes within a certain proximity of the virtual object (e.g., when the user device has coordinates in the virtual world that are within a certain distance from the coordinates of the virtual object). In some examples, other real world goods and/or services may be attached with the virtual object and exchanged with the virtual object (e.g., tickets, money, digital media, coupons, calling card, and/or the like). In some examples, more than one virtual object may be created, and a user may cause the virtual objects to interact with each other in a certain manner. For example a user may create a virtual box as a virtual object, which may have the capability of being locked with a passcode and/or a virtual padlock. The user may be able to drop another virtual object, such as a note, within the virtual box and close the box. In this manner, the location of the note may be tied to the box and unreadable until the box is opened.

In some embodiments, the settings may designate one or more users with permission to view, detect, and/or manipulate the virtual object. In some examples, a user may manually enter a designated user that may view, manipulate, and/or take possession of a virtual object. In some examples, a user may be able to select a user from a list. The list may be provided by the system or a third party device. In some examples, the system may provide the list based on a geo-fence that the user is located in. For example, the user may be within a geo-fence that encompasses a restaurant. The system may receive GPS coordinates from the user device indicating that the user is within the geo-fence, and in response, provide the user with a list of users associated with the geo-fence, such as chefs, waiters, bar tenders, and/or the like. In this manner, a user may easily find and direct a virtual object to a particular individual. Although this example is provided in the context of a restaurant, other examples may include other types of establishments.

In some embodiments, the system may provide a list of users within a predetermined proximity to the user. For example, the system may receive GPS coordinates from the user device, and in response, update the user device with a list of users within the predetermined proximity. In some examples, the predetermined proximity may be user specified.

In some embodiments, the settings may designate a group of users with permission to view and/or interact with a virtual object. For example, users associated with a geofence location, employees of an establishment, user of a certain age, and/or the like.

In some examples, the user may associated the virtual object with a physical object, such that viewing the virtual object becomes visible or displayed on a user device when the table is in view of the user device. For example, the physical object may be in communication with the system and provide a GPS location, and the system may instruct that the virtual object be displayable on the user device when a field of view of the user device (discussed in more detail below) encompasses the GPS location.

In some embodiments, permission for a virtual object may depend on whether a user has certain combination of virtual objects in their account's inventory, whether the user has conducted certain actions, whether the user belongs to a certain group, and/or the like. For example, permission to view and/or interact with the virtual object may be based on whether a user device has been at one or more geo-locations, one or more virtual objects (e.g. virtual keys), and/or is part of a private group. In some examples, there may be a timer setting that causes the virtual object to perform a certain action when the timer runs out. For example, after a period of time, the virtual object may disappear, change ownership, send a notification, change locations and/or the like.

At process 102, the system may determine the location of the first user device with respect to a virtual world and/or map. In some examples, the location may be determined based on the location information received at process 101. In some examples, device location information may be data representing the approximate location of the user device. Location information may include geographical location, orientation, elevation and/or the like. In some examples, location information may include data indicative of the direction the device or a sensor, such as an image sensor, is pointing. The direction may be provided as a vector and/or field of view.

At process 103, the system may implement the virtual object request at process 101 in a virtual world and/or map for interaction. In some examples, the server may store the existence of the virtual object in a database with associated settings and information for rendering by user devices. For example, the virtual object may be associated with a 3-D model that may be rendered for viewing on a display. The 3-D model may be created by a user, selected from a predetermined set of 3-D models, and/or a combination of user created elements (such as text, color, lines, drawings, etc.) applied to a predetermined 3-D model. The system may give the virtual object a location in space in a virtual world and/or map. In some embodiments, the virtual object may be assigned global positioning system (GPS) coordinates. In some embodiments, the virtual object may be assigned a coordinate location within a virtual world coordinate system. In some examples, the coordinate location in the virtual world may be Cartesian coordinates. In some embodiments, the virtual world coordinate system may be translatable, transformed, and/or mapped to a GPS coordinate system along with other real world positional information, such as elevation and orientation. In some embodiments, the 3-D model may have one or more vectors to indicate the orientation of the object and/or the direct the object is facing in relation to one or more coordinate systems. The 3-D models may be replicated on one or more user devices for rendering and display.

In some embodiments, the GPS coordinates initially assigned to the virtual object may depend, at least in part, on the location of the user device. For example, based on a combination of a previous calibration, changes in movement of the user device in relation to the calibrated orientation, GPS coordinates, and information regarding the hardware of the device requesting the virtual object, the system may assign the device directional vectors and positional coordinates in the virtual world. When the virtual object is created, the virtual object may be given positional coordinates in the virtual world based on a predetermined distance from the positional coordinates of the user device, one or more of the directional vectors, and/or field of views of the user device at the time of the request. In some embodiments, the positional coordinates in the virtual world may map to GPS coordinates in the real world. In some embodiments, the virtual object may be assigned positional coordinates in a virtual world rather than GPS coordinates and the system may map GPS coordinates to coordinates of the virtual world. In some embodiments, the user device may provide the positional coordinates for placing the virtual object in the virtual world, which may be provided as an input by the user.

In some embodiments, the system may place the virtual object within a predetermined distance of a device of an intended and/or designated user. For example, a first user may want to send a virtual object to a second user who may be half way around the world. The first user may set the location of the virtual object to GPS coordinates of a device registered to the second user or within a threshold distance of the GPS coordinate. In this manner virtual objects can be shared across large distances. In some examples, the first user may be able to change the location of their user device to a virtual location of the second user device such that the first user may personally place the virtual object as if the first user's device were in the virtual world located where the second user device is located. In some examples, the first device, when switching to a different location, may change from an augmented reality display that is a combination of real world images with virtual 3-D models to a completely virtual world. In some examples, the system may provide a virtual world 3-D model based on the real world to the first user device. The virtual 3-D model may mimic the real life location of the second user device along with the other virtual objects in the virtual world. In this manner, the first user may be able to get a feel for what the second user is seeing and better place the virtual object. For example, if the second user were at a restaurant, the first user device may be provided with a virtual rendering of the restaurant including virtual tables and chairs in place of the physical tables and chairs at the restaurant.

In some examples, the virtual object may be assigned a location based on a physical object, such as a table. The table may provide GPS coordinates and the virtual object may be set to be located at a location in relation to the GPS location of the object. In this manner, the virtual object may follow a physical object and may be given the illusion that the virtual object is resting on top of the physical object.

At process 104, the system may notify a second user of the virtual object and allow for the second device to view the virtual object. In some embodiments, the second user may be identified using information received at process 101. For example, the system may receive an account identifier for the second user and send the notification through email, SMS, and/or the like to an address associated with the account. The notification may include directions or location information of the virtual object such that the second user may find the virtual object. In some embodiments, the notification may also provide the user the ability to change the location of the virtual object, such as to a location of the user device of the second user.

Figure 2:
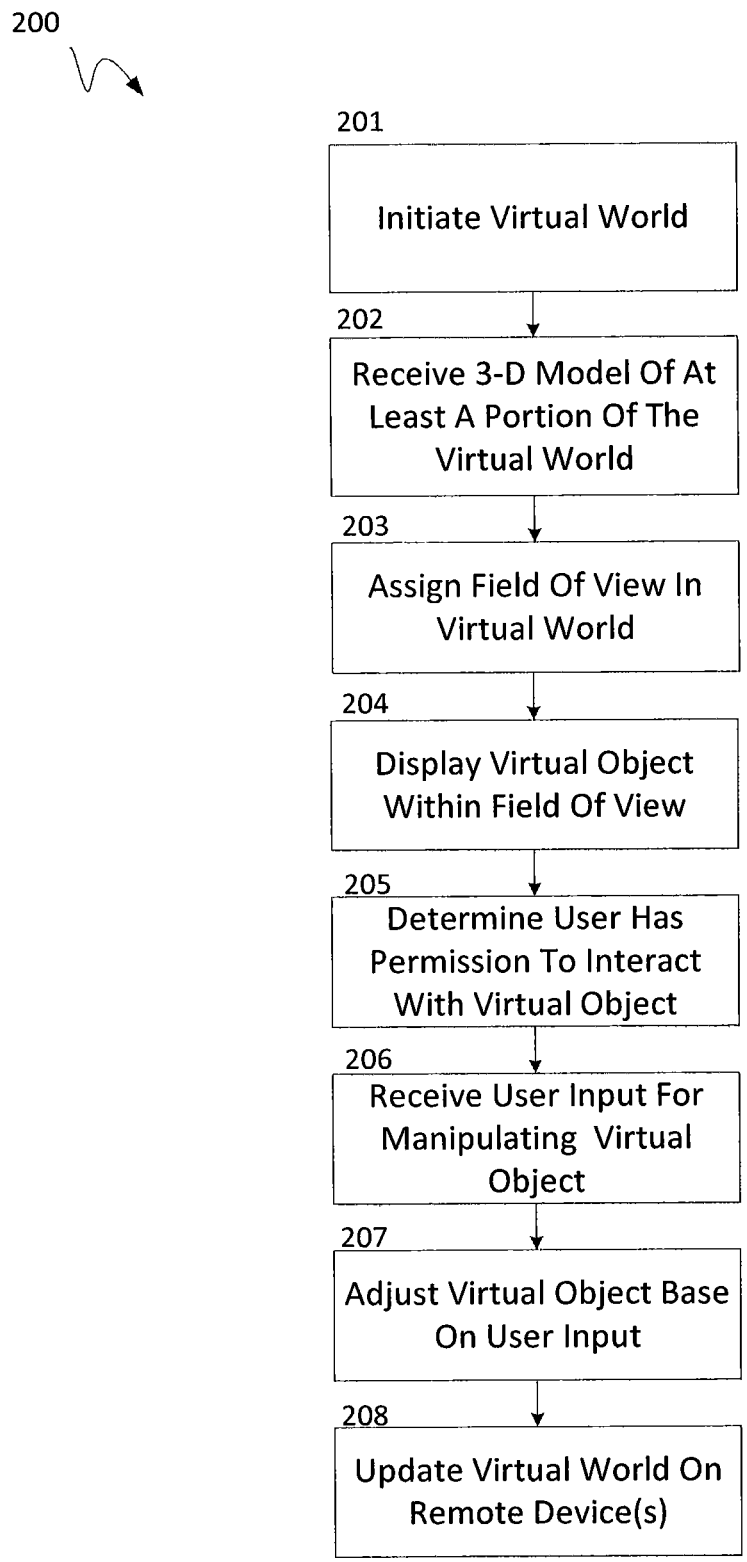
FIG. 2 is a flow diagram illustrating an exemplary process for interacting with virtual objects according to some embodiments

FIG. 2 is a flow diagram illustrating an exemplary process 200 that may be implemented by a user device for interacting with virtual objects according to some embodiments. According to some embodiments, processes 200 may include one or more of the processes 201-208 which may be implemented, at least in part, in the form of executable code stored on a non-transitory, tangible, machine readable media that, when run on one or more processors, may cause the one or more processors to perform one or more of the processes 201-208.

At process 201, the user device may initiate a virtual world for display from a system orchestrating the virtual world. The initiation of the user device may include registering with a server or system, such as a system implementing process 100 of FIG. 1. Registering may include providing login information, device identifiers, and/or the like. The user device, as part of the initiation, may also provide GPS coordinates to the system such that the system may map the user device to a position in a virtual world. In some embodiments, initiation may include a calibration. The user device may conduct a calibration to obtain an initial or reference location and/or orientation of the user device in the real world for establishing a corresponding location and orientation in the virtual world.

At process 202, the user device may receive at least a portion of a three dimensional (3-D) model of a virtual world, map of the virtual world, and/or virtual objects for detection and/or rendering on the user device from the server. In some examples, the portion of the virtual world provided by the server and received by the user device may depend on the GPS coordinates provided. In some examples the virtual object that are received for rendering may depend on an account associated with the user device. For example, there may be a plurality of virtual objects in the portion of the virtual world that the user device receives. At least some of those virtual objects may be designated to particular users and/or accounts. In some examples, the user device may receive virtual objects for rendering that are associated with the user account and not virtual objects that are not associated with the user account. In some embodiments, rendering a virtual object may depend on the permission settings of the virtual object in relation to the user account and/or device. In some examples, the user device may render virtual objects for display that are associated with the account and not objects not associated with the account. In some examples, the user settings may cause the virtual object to be seen and/or interacted with only by intended recipients.

In some examples, the user device may also receive an initial virtual world location and orientation information for the user device based on the calibration in process 201. For example, a system may provide the user device an initial direction that the user device is pointing in the virtual world and a three dimensional location, such as Cartesian coordinates in the virtual world. In some examples, the user device may determine the initial direction and/or location of the user device in the virtual world based on the virtual map received.

At process 203, the user device may assign a field of view and vector in the virtual world that may move depending on movements sensed by the user device. In some examples, the user device may use the field of view to determine what is displayed on the user device. In some embodiments, the user device may have one or more of a geo-locator, magnetometer, barometer, accelerometer, gyroscope, and/or the like to sense and track the orientation and movement of the user device. The user device may translate those motions into changes in coordinates and vectors in the virtual world associated with the user device, which may affect the direction of a field of view vector for the device. In some embodiments, the field of view may be configured to track one or more pieces or components of the user device, such as an image sensor, to aid in creating the illusion of augmented reality.

At process 204, the user may provide user input by changing the orientation of the user device such that one or more 3-D models of virtual objects are within the field of view established at process 203. In response, the user device may detect and/or display the one or more virtual objects in the display. In some embodiments, the user device may display virtual objects that are associated with the user device or public for viewing but not virtual objects that are private and unassociated with the user device or when the user device lacks the appropriate permissions.

In some embodiments, other 3-D models of the virtual world within the field of view may be displayed along with the virtual objects. In some embodiments, the virtual world, virtual objects, and/or other 3-D models may be displayed as an overlay to images received from an image sensor of the user device. In this manner, the illusion of an augmented reality may be established.

At process 205, the user device may determine that the user or user device has permission to interact with the virtual object. In some examples, there may be setting provided by the server indicating that user or user device has permission to interact with the object. Interacting may include moving the virtual object, taking possession of the virtual object, change settings for the virtual object, and/or the like. In some embodiments, the user device may notify users that the virtual object may be interacted with. The user device may notify the user by highlight the virtual object, display a message, and/or the like.

At process 206, the user device may receive user input from the user for manipulating a virtual object. In some examples, the input may depend on the device. In some examples, the input may be a selection of the virtual object by tapping on a touch screen that represents the location of the virtual object displayed on the user device. In some examples, the user device may receive input from a peripheral device, such as a controller glove, indicating manipulation of the virtual object.

At process 207, the user device may process the user input and accordingly adjust the virtual object, such as changing the coordinate location of the virtual object, changing a setting on the virtual object, playing an animation related to the virtual object, changing possession of the virtual object, changing accounts and/or user device that may view/display or not view/display the virtual object, causing an action (e.g. transferring currency, transferring ownership of goods, providing a ticket for access to a service, displaying an animation, etc.), and/or the like. In some examples, a user may move the virtual object freely in space to create the appearance that the virtual object is being supported by a physical real world object, such as a table.

At process 208, the user device may provide the system and/or server orchestrating the virtual world updates to the changes and/or adjustments of the virtual object that occurs at process 207.

Figure 3:
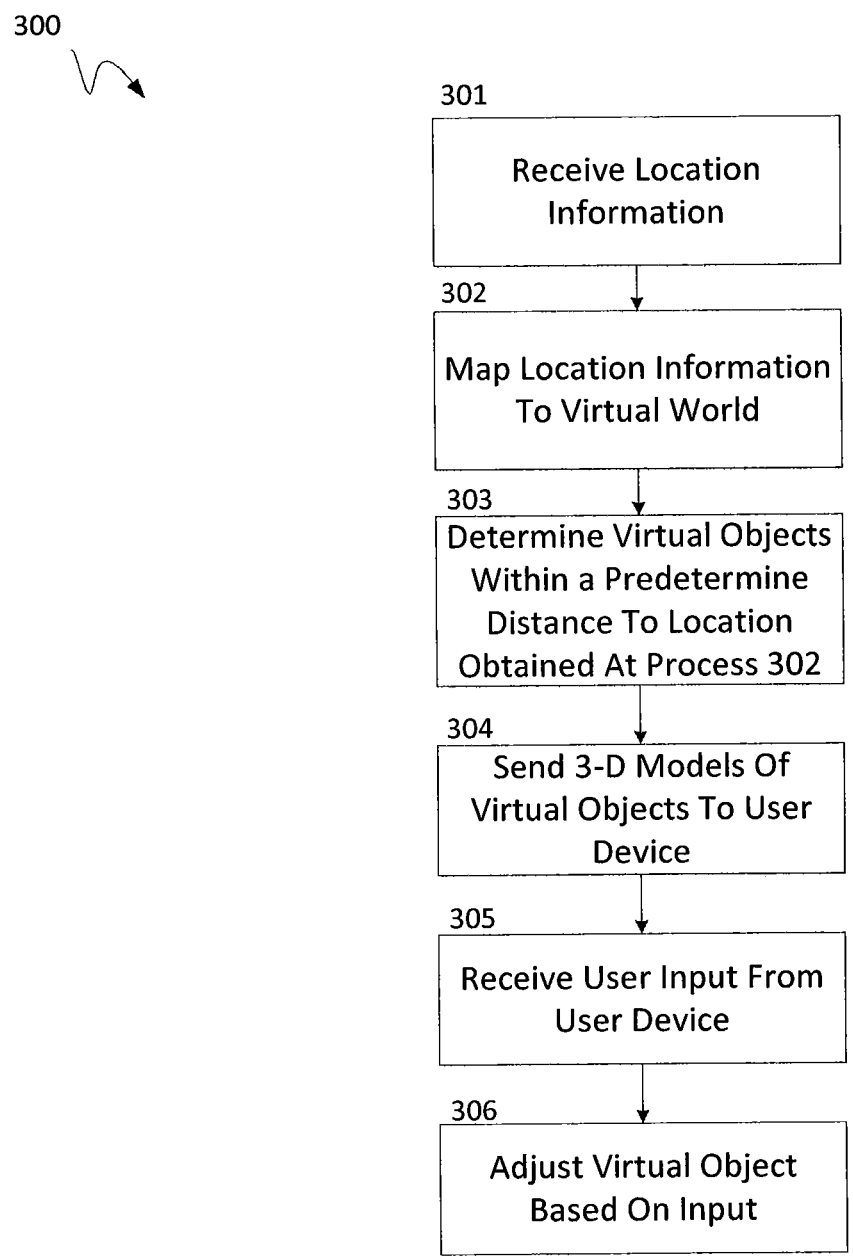
FIG. 3 is a flow diagram illustrating an exemplary process for displaying virtual objects according to some embodiments

FIG. 3 is a flow diagram illustrating an exemplary process 300 that may be implemented by a system to cause a user device to display virtual objects according to some embodiments. According to some embodiments, processes 200 may include one or more of the processes 301-306 which may be implemented, at least in part, in the form of executable code stored on a non-transitory, tangible, machine readable media that, when run on one or more processors, may cause the one or more processors to perform one or more of the processes 301-306.

At process 301, the system may receive location information for a user device. In some examples, the location information may be GPS coordinates and/or elevation readings. In some examples, a user device may provide the system with regular and/or periodic updates to the location of the user device.

At process 302, the system may map the location information received at process 301, such as GPS coordinates to coordinates in a virtual world. In some embodiments, the location information received at process 301 may already be in coordinates of the virtual world, which may allow for this process to be omitted.

At process 303, the system may determine whether there are any virtual objects within a predetermined area in the virtual world based on the coordinates received at process 302. In some examples, the system may determine whether there are any virtual objects within the predetermined area associated with the account of the user device. In some examples, the system may receive account information associated with the user device and use the account information to determine if a virtual object is associated with the user device.

At process 304, the system may provide the 3-D models of the virtual objects and information regarding the virtual objects determined at process 303 for rendering by the user device. In this manner, the system would cause the user device to render the virtual object when certain parameters are met. For example, the user device may display objects in the virtual world on a screen of the user device when those objects are in a field of view of the user device.

At process 305, the system may receive input from the user device associated with an action performed on the virtual object, such as the input described in FIG. 2 at process 208. In some examples, the input may be an indication to take ownership of the virtual object. In some embodiments, the input may be to move the virtual object and/or change other attributes of the virtual object. Other actions or settings for the virtual object may be provided as input, such as appearance, notes, notifications, visibility, account associations, animations, and/or the like. In some examples, taking ownership of the virtual may cause the system to link the location of the virtual object to the location of the user device such that the virtual object moves with the user device. For example the system may cause the virtual object to have the same GPS coordinates as the user device but a different elevation. In this manner, other users (e.g. friends, creator of the virtual object, etc.) may be able to identify the user from a crowed by viewing the virtual object above the user.

At process 306, the system may log the action and adjust attributes of the virtual object based on the user input received at process 305. For example, the system may change the coordinates of the virtual object when a user input indicates a movement of the virtual object. In some examples, the user input from process 305 may cause the virtual object to change ownership. The virtual object may act as an easily identifiable virtual badge. In some embodiments, the owner of the virtual device may be able to configure whether the virtual object is detectable and/or displayed on other devices or not.

Figure 4:
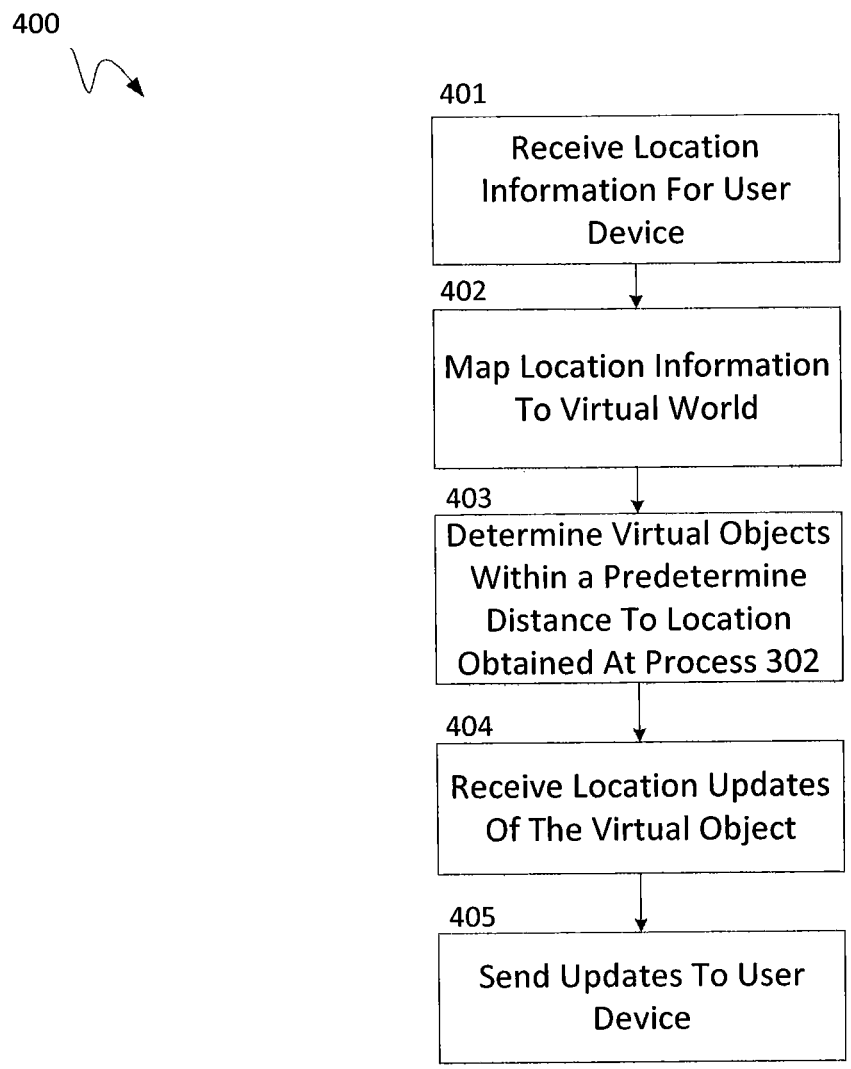
FIG. 4 illustrates a flow diagram illustrating an exemplary process for displaying a virtual object that tracks a device.

FIG. 4 illustrates a flow diagram illustrating an exemplary process 400 that may be implemented by a system to cause a user device to display a virtual object that tracks a device, such as a user device. According to some embodiments, processes 400 may include one or more of the processes 401-506 which may be implemented, at least in part, in the form of executable code stored on a non-transitory, tangible, machine readable media that, when run on one or more processors, may cause the one or more processors to perform one or more of the processes 401-406.

At process 401, the system may receive location information for a user device. In some examples, the location information may be GPS coordinates. In some examples, a user device may provide the system with regular and/or periodic updates to the location of the user device.

At process 402, the system may map the location information received at process 301, such as GPS coordinates, to coordinates in a virtual world. In some embodiments, the location information received at process 301 may already be in coordinates of the virtual world, such that this process may be omitted.

At process 403, the system may determine whether a virtual object associated with the user device is within a threshold distance of the user device. In some examples, the system may compare the location information received at process 301 with location information of the virtual object to determine if the virtual object is within a threshold distance.

At process 404, the system may receive updates of the location of the virtual object in the virtual world along with updates of the location of the user device in the virtual world. For example, the location of the virtual object may be tied to the location of a second user device and as the server receives updates on the location of the second user device, the system may update the location of the virtual object. Similarly, the system may receive location information of the user device and update the location of the user device in the virtual world based on the updates.

At process 405, the system may send to the user device the 3-D model of the virtual object and updated locations as received in process 404 to the user device. In this manner the user device can render the 3-D model of the virtual object and track the location of the virtual object in relation to the user device. In some embodiments, the user device may remove the virtual object from memory once the user device is beyond a threshold distance from the virtual object.

Figure 5:
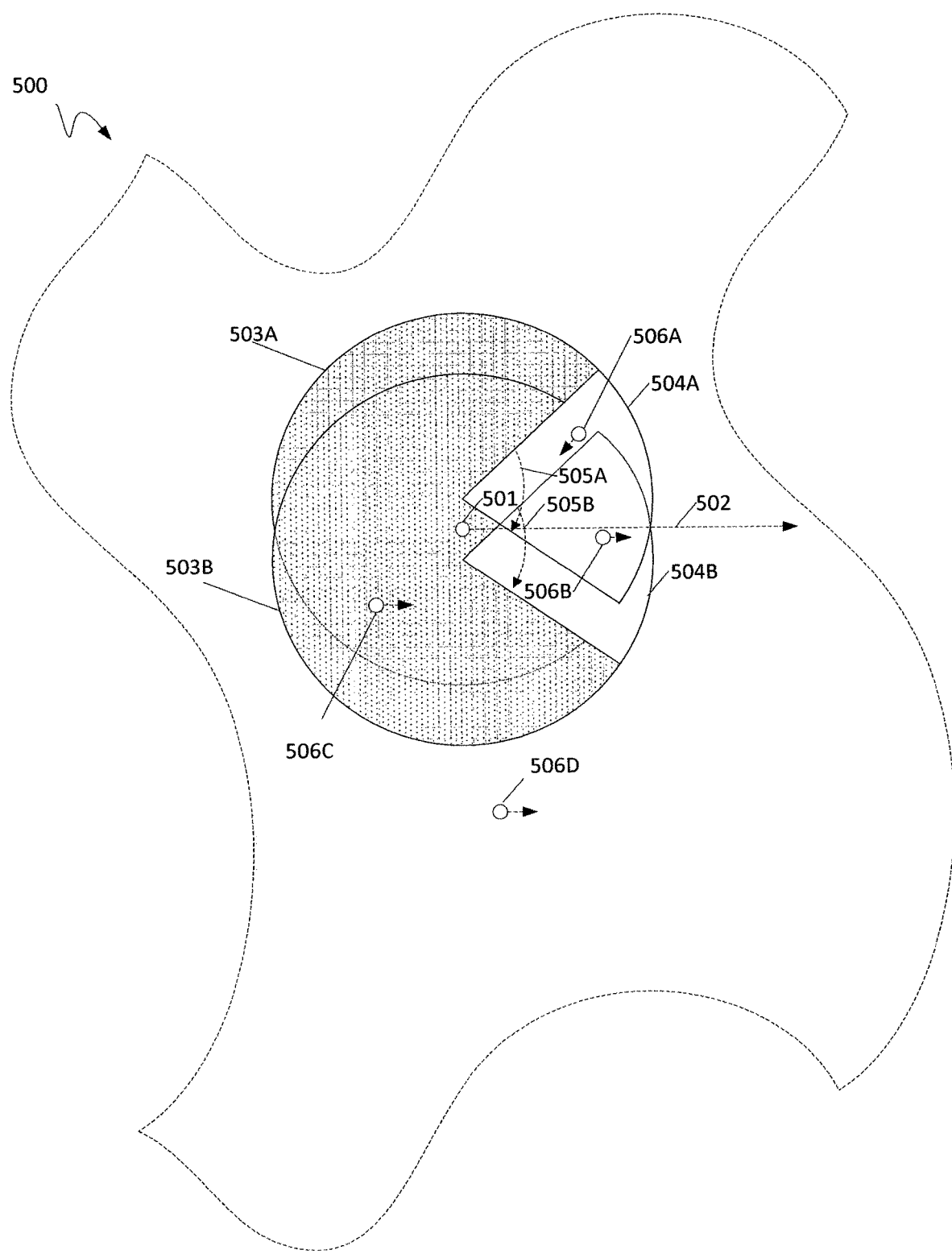
FIG. 5 illustrates an overhead view of an exemplary implementation of a virtual world.

FIG. 5 illustrates an overhead view of an exemplary virtual world 500 according to some embodiments. In some examples virtual world 500 may be a computer simulated environment with a plurality of virtual models the can be rendered and displayed on a user device. In some examples, virtual world 500 may be part of a much larger virtual world that expands beyond the edges of virtual world 500. In some examples, virtual world 500 may be stored on one or more remote servers and provided to a user device for rendering and display on an electronic display.

In this example, point 501 depicts a virtual location of a user device in virtual world 500. Point 501 may have GPS coordinates, Cartesian coordinates associated with virtual world 500 and/or other coordinates for tracking the location of the user device in virtual world 500. In some examples, each position in virtual world 500 may map to real world GPS coordinates. In some examples, a user device and/or server may track the position and/or movement of a user device in the real world and update virtual location of the user device in the virtual world accordingly. For example, when a user device moves, the GPS location of the user device may change to a new GPS location. In response to the change, the user device and/or a server for orchestrating the virtual world may map the new GPS location to new virtual world coordinates and update the virtual location of the user device with the new virtual world coordinates. In some examples, the GPS location may only map to a portion of the virtual location of the user devices. For example, the virtual location may have an elevation part that may change based on readings other than GPS readings. The virtual location of point 501 may have X and Y axis coordinates that change based on GPS readings and Z axis coordinates that change based on the elevation readings from the user device. In some examples, the Z axis coordinates may change based on one or more sensor readings from the user device, such as an accelerometer, gyroscope, barometer, and/or the like.

Vector 502 illustrates a vector indicating a virtual orientation of the user device in virtual world 500. In some examples, vector 502, along with the virtual location of the user device, may be used to determine which portions of virtual world 500 is displayed on one or more displays of the user device. In some examples, vector 502 may be a three dimensional vector. In some examples, vector 502 may map to a direction that a user device is pointing, such as an image capture sensor of a user device. In some examples, to obtain and track the vector of the user device, the user device may conduct a calibration. For example, a user may be instructed to calibrate the user device by having the user device lay flat on a flat surface in a particular orientation. In this manner, an initial orientation of the user device and an initial vector associated with that orientation may be determined for the user device in the virtual world. As such, movement and changes to the orientation of the user device may be captured by motion sensors on the user device, such as a gyroscope and/or an accelerometer. The sensor readings may be used to determine the change in orientation and map to changes in the direction vector 502 is pointing.

In some examples, a user device may provide a GPS location associated with point 501, and in response, a server may provide a portion of virtual world 500 for display on one or more displays of the user device. For example, the portions of virtual world 500 within the circle 503A and 503B may be sent to a user device for rendering and display on the user device. Note that circle 503A and 503B may by a three dimensional sphere in a three dimensional virtual world 500, but is shown as a circle because of the overhead view. Although the area of the virtual world provided to the user device in this example may be a circle or sphere (503A and 503B), other shapes may be implemented. For example, partial cubes of virtual world 500 may be sent to the user device. In some examples, the entirety of virtual world 500 may be sent to the user device.

In some embodiments, the portions of virtual world 500 displayed on one or more displays of a user device may depend on the area covered by field of view 504A and 504B. In some examples, the area covered by view of view 504A and 504B may be portions of virtual world 500 that the user device has rendered and/or buffered. In some examples field of view 504A and 504B may be represented by one or more angles such as 505A and 505B and/or angles that are perpendicular to angles 505A and 505B. Although in FIG. 5 the field of view is represented by a circular sector, the field of view may be represented by a three dimensional cone/spherical sector, which may be represented by one or more angles. In some examples, the field of view used for display on a user device may depend on the resolution and size of the display and magnification (zoom) settings. In some examples, the field of view may take the form of other shapes.

As shown in this example, there are two field of views that are separated by a small distance. In some examples, the two field of views may be used by a user device to simulate stereoscopic vision. In some examples, there may be two displays, such as the two displays on an optical head mount. In some examples, a single display may display both images rendered from field of view 504A and 504B, but apply a filter on one or more of the images such that a user may wear glasses that filters one of the images from being seen from one eye and the other image for the other eye (e.g. 3-D Glasses). In some examples, the display may use a single field of view centered at location 501.

In some examples, field of view 504A and 504B may move depending on the location of point 501 and the direction of vector 502. For example, when the elevation (not shown) of point 501 changes, the elevation of the field of view 504A and 504B may change. Similarly, when the location of point 501 changes, the area covered by field of view 504A and 504B may follow and change also. Additionally, field of view 504A and 504B may follow vector 502, such that as the orientation of the user device changes, field of view 504A and 504B may also move and change, and in turn, change what is displayed on the user device. As such, the display may provide the illusion of traveling through the virtual world with the user device as the user device moves and changes orientation.

In some examples, virtual world 500 may include virtual objects 506A-D. Virtual objects may have an orientation vector for indicating the orientation of the virtual object. In some examples, depending on whether one of more virtual objects 506A-D are associated with user device located at location 501 or an account that the user device has logged into, one or more virtual object 506A-D may be displayed on a display of the user device when within field of view 504A and/or 504B.

For example, the device may be logged into an account associated with virtual object 506A. In this example, because virtual object 506A is in field of view 504A, the corresponding display of the user device may display virtual object 506A. However, because virtual object 506A is not within field of view 504B, the corresponding display for field of view 504B may not display object 506A.

With respect to virtual object 506B, because virtual object 506B is within both fields of view 504A and 504B, virtual object 506B would be displayed in both corresponding displays of the user device. However, the perspective or the part of virtual object 506B being displayed may differ because the point of view of virtual view 504A is from a different location than field of view 504B. In some examples, the vantage point for field of view 504B and 504A may be to create the illusion of a stereoscopic view of virtual object 506B.

In some examples, virtual object 506B may not be associated with the user device or an account of the user device having field of view 504A and 504B. In such an example, the user device may not display virtual object 506B and/or have any indication that virtual object 506B exists.

In some examples, virtual object 506C may be within areas of 503A and 503B. In some examples, the user device may render virtual object 506C such that if and/or when the user device is move and/or oriented such that field of view 504A and/or 504B encompasses virtual object 506C, virtual object 506C will be displayed on the user device. In some examples, the user device may not render virtual object 506C until it is within field of view 504A and/or 504B.

However, pre-rendering and/or buffering images for display may help reduce the appearance of lag on the user device as the images change.

In some examples, virtual object 506D may exist in virtual world 500, but may not be within the areas covered by 503A and 503B. In such a case, the user device might not have any indication that virtual object 506D is in virtual world 500 whether virtual object 506D is associated with the user device and/or an account of the user device or not. In some examples, the user device may not receive an indication of the existence of virtual object 506D or renderable elements of virtual object 506D until the user device is moved such that area 503A and/or area 504B covers virtual object 506D. In some examples, area 503A and 503B may move with point 501.

In some examples, one or more of virtual objects 506A-D may be moveable or move. For example, one or more virtual object 506A-D may be configured to maintain coordinate position in virtual world 500 that is fixed near coordinates of a user device, such as point 501 or other points for other devices (not shown). In such an example, virtual objects may move into or out of the area covered by 503A and/or 503B and/or fields of view 504A and/or 504B. As such, a server orchestrating virtual world 500 may provide one or more of virtual objects 506A-D to a user device for rendering as it comes within the area of 503A and/or 503B. Furthermore, one or more virtual objects 506A-D may be displayed or removed from the display of the user device as it goes in and out of field of view 504A and/or 504B.

Figure 6:
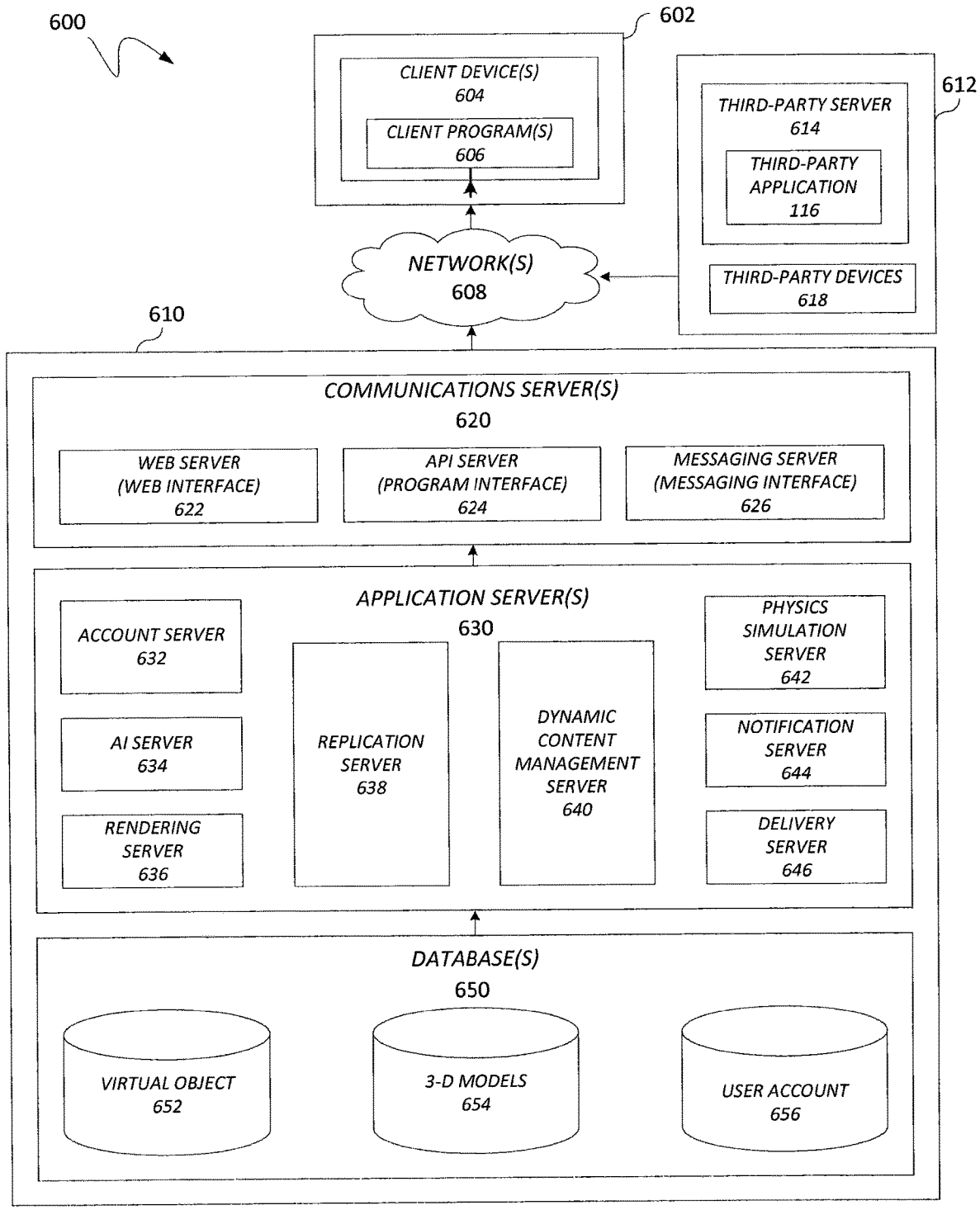
FIG. 6 illustrates, in block diagram format, an exemplary embodiment of a computing system adapted for implementing one or more processes of private virtual object handling.

FIG. 6 illustrates, in block diagram format, an exemplary embodiment of a computing system adapted for implementing one or more of the processes discussed above. As shown, a computing system 600 may comprise or implement a plurality of servers and/or software components that operate to perform various methodologies in accordance with the described embodiments. Exemplary servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 6 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 600 may include, among various devices, servers, databases and other elements, one or more clients 602 that may comprise or employ one or more client devices 604, such as a laptop, a mobile computing device, a tablet, a PC, a wearable device, and/or any other computing device having computing and/or communications capabilities in accordance with the described embodiments. Client devices 604 may include a cellular telephone, smart phone, optical head mount display, or other similar mobile devices that a user may carry on or about his or her person and access readily.

Client devices 604 generally may provide one or more client programs 606, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, gaming engines (e.g. Unreal, Unity, CryEngine, Torque 3D, UDK, Vision Engine, id Tech, Chrome, Source, and others), a web browser application, database application, media application (e.g., music, video, television), location-based services (LBS) applications (e.g., GPS, mapping, directions, positioning systems, geolocation, point-of-interest, locator) that may utilize hardware components such as an antenna, gyroscope, magnetometer, accelerometer and so forth. One or more of client programs 606 may display various graphical user interfaces (GUIs) to present information to and/or receive information from one or more users of client devices 604. In some embodiments, client programs 606 may include one or more applications configured to conduct some or all of the functionalities and/or processes discussed above.

As shown, client devices 604 may be communicatively coupled via one or more networks 608 to a network-based system 610. Network-based system 610 may be structured, arranged, and/or configured to allow client 602 to establish one or more communications sessions between network-based system 610 and various computing devices 604 and/or client programs 606. Accordingly, a communications session between client devices 604 and network-based system 610 may involve the unidirectional and/or bidirectional exchange of information and may occur over one or more types of networks 608 depending on the mode of communication. While the embodiment of FIG. 6 illustrates a computing system 600 deployed in a client-server operating environment, it is to be understood that other suitable operating environments and/or architectures may be used in accordance with the described embodiments.

Data communications between client devices 604 and the network-based system 610 may be sent and received over one or more networks 608 such as the Internet, a WAN, a WWAN, a WLAN, a mobile telephone network, a landline telephone network, as well as other suitable networks. For example, client devices 604 may communicate with network-based system 610 over the Internet or other suitable WAN by sending and or receiving information via interaction with an application. Any of a wide variety of suitable communication types between client devices 604 and system 610 may take place, as will be readily appreciated. In particular, wireless communications of any suitable form may take place between client device 604 and system 610, such as that which often occurs in the case of personal and/or mobile devices.

In various embodiments, computing system 600 may include, among other elements, a third party 612, which may comprise or employ a third-party server 614 hosting a third-party application 616 and third-party devices 618. In various implementations, third-party server 614 and/or third-party application 616 may host applications associated with or employed by a third party 612. For example, third-party server 614 and/or third-party application 616 may enable network-based system 610 to provide client 602 with additional services and/or information, such as third-party account information, access to one or more of networks 608, and/or the like. Third-party server 614 and/or third-party application 616 may also provide system 610 and/or client 602 with other information and/or services, such as social networking services and/or information, user identifiers, payment services and/or information, and/or other services and/or information. Third-party server 614 and/or third-party application 616 may work with third-party devices 618 to provide some of the third-party services. For example, third-party devices may be may be wireless communication devices such as Bluetooth® beacons, wireless switches and/or routers, RF transmitters, IR transmitters, and/or the like. In some examples third-party devices 618 may be used to locate and/or determine the location of a user 602 by locating one or more of client devices 604. For example, third-party devices 618 may be wireless beacons using Bluetooth® Low Energy that can connect, communicate, and triangulate the location of one or more user devices 602 when within communication proximity.

In one embodiment, third-party server 614 may include a social networking server that hosts a user's social network account. In another embodiment, third party-server 614 may include one or more servers for aggregating user data and statistics.

Network-based system 610 may comprise one or more communications servers 620 to provide suitable interfaces that enable communication using various modes of communication and/or via one or more networks 608. Communications servers 620 may include a web server 622, an API server 624, and/or a messaging server 626 to provide interfaces to one or more application servers 630. Application servers 630 of network-based system 610 may be structured, arranged, and/or configured to provide various services, account authentication, virtual world/virtual map loading, account management, property exchanges, multi-device data replication, 3-D model handling, Physics simulator, and other services to users that access network-based system 610. In various embodiments, client 602 may communicate with applications servers 630 of network-based system 610 using one or more client devices 604 via one or more of a web interface provided by web server 622, a programmatic interface provided by API server 624, and/or a messaging interface provided by messaging server 626. It may be appreciated that web server 622, API server 624, and messaging server 626 may be structured, arranged, and/or configured to communicate with various types of client devices 604 and/or client programs 606 and may interoperate with each other in some implementations.

Web server 622 may be arranged to communicate with web clients and/or applications such as a web browser, web browser toolbar, desktop widget, mobile widget, web-based application, web-based interpreter, virtual machine, and so forth. API server 624 may be arranged to communicate with various client programs 606 and/or a third-party application 616 comprising an implementation of API for network-based system 610. Messaging server 626 may be arranged to communicate with various messaging clients and/or applications such as e-mail, IM, SMS, MMS, telephone, VoIP, video messaging, and so forth, and messaging server 626 may provide a messaging interface to enable access by client 602 and/or third party 612 to the various services and functions provided by application servers 630.

Application server 630 of network-based system 610 may provide services such as, account services, dynamic content management services, property exchange services, user data gathering services, location services, notification services, fund transfer, funds and/or currency exchanges and/or other services. Application servers 630 may include an account server 632, a replication server 638 for replicating user actions over several user devices, a dynamic content management server 640, a physics simulation server 642 for simulating virtual object interactions and movements, a notification server 644, and/or a delivery server 646. Application servers 630 may further include an artificial intelligence (AI) server 634, a 3-D model creation/rendering server 636. These servers, which may be in addition to other servers, may be structured and arranged to aid in orchestrating an interactive virtual world over multiple users in addition to some or all of the other services as discussed above.

Application servers 630, in turn, may be coupled to and capable of accessing one or more databases 650 including a virtual object database 652, a 3-D models database 654, and/or user account database 656. Databases 650 generally may store and maintain various types of information for use by application servers 630 and may comprise or be implemented by various types of computer storage devices (e.g., servers, memory) and/or database structures (e.g., relational, object-oriented, hierarchical, dimensional, network) in accordance with the described embodiments.

Figure 7:
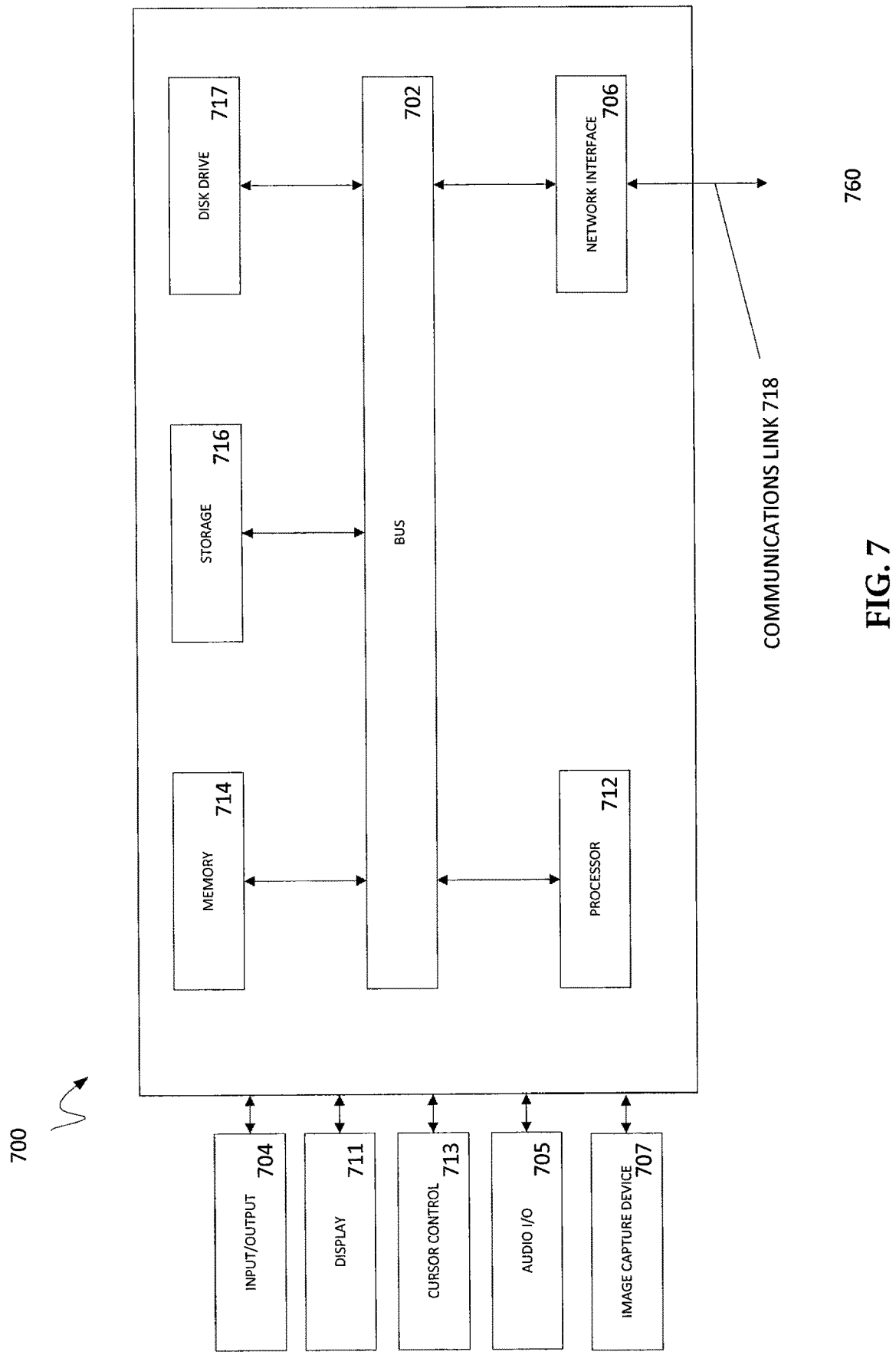
FIG. 7 is a block diagram of an exemplary computer system for implementing one or more devices of the computing system in FIG. 6.

FIG. 7 illustrates an exemplary embodiment of a computer system 700 adapted for implementing one or more of the devices and servers of FIG. 6. As shown, a computer system 700 may comprise or implement software components that operate to perform various methodologies in accordance with the described embodiments. Some computer systems may implement one or more operating systems (OS) such as a MICROSOFT® OS, a UNIX® OS, a LINUX® OS, or other suitable OS. It may be appreciated that the system illustrated in FIG. 7 may be deployed in other ways and that the operations performed and/or the services provided by the system may be combined, distributed, and/or separated over several systems over a network for a given implementation and may be performed by any number of systems. One or more systems may be operated and/or maintained by the same or different entities.

In various implementations, a device that includes computer system 700 may comprise a personal computing device (e.g., a smart or mobile phone, a computing tablet, a personal computer, laptop, wearable device, PDA, Bluetooth device, key FOB, badge, etc.).

Computer system 700 may include a bus 702 or other communication mechanisms for communicating information data, signals, and information between various components of computer system 700. Computer system 700 may include an input/output (I/O) component 704 that processes a user input, such as a keyboard, keypad, touchpad, touch screen, mouse, joystick, gaming controller, other controller devices, gyroscope, GPS, accelerometer, barometer, magnetometer, etc., and sends a corresponding signal to bus 702. Computer system 700 may include a display 711 and a cursor control 713 as an I/O component. Computer system 700 may include an audio I/O component 705. Audio I/O component 705 may allow a user to use voice for inputting information by converting audio signals into digital signals that may be recorded in a storage component such as memory 714, storage 716, and/or disk drive 717. Audio I/O component 705 may also be configured to output audible sounds in response to received electronic signals. In some embodiments, Audio I/O component 705 may be one or more of a speaker and/or microphone. In some embodiments, computer system 700 may include one or more image capture devices 707, such as a digital camera, video recorder, and other optical sensors for receiving, capturing, and/or recording images.

Computer system 700 may have a transceiver or network interface 706 that transmits and receives signals between computer system 700 and other devices through communication link 718. In various embodiments, Communication link 718 may be wireless, although other transmission mediums and methods may also be suitable. Computer system 700 may include a processor 712, which may be a micro-controller, digital signal processor (DSP), or other processing component for processing information and implementing one or more embodiments described herein.

Components of computer system 700 may also include a system memory component 714 (e.g., RAM), a static storage component 716 (e.g., ROM), and/or a disk drive 717. Computer system 700 may perform specific operations by processor 712 and other components by executing one or more sequences of instructions contained in system memory component 714. Logic may be encoded in a computer readable medium, which may refer to any medium that participates in providing instructions to processor 712 for execution. Such a medium may take many forms, including but not limited to, non-volatile media, volatile media, machine readable media, and/or transmission media. In various implementations, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes or capable of distinguishing ones and zeros, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including, but not limited to, telecommunications, mobile, and cellular phone networks) may perform instruction sequences to practice the present disclosure in coordination with one another.

A computer system may transmit and receive messages, data, information and instructions, including one or more programs (i.e., application code) through a communication link and a communication interface. Received program code may be executed by a processor as received and/or stored in a disk drive component or some other storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system. Where applicable, the ordering of various steps described herein may be changed, omitted, combined into composite steps, and/or separated into sub-steps to provide features described herein.

The foregoing networks, systems, devices, and numerous variations thereof may be used to implement one or more services, such as the services discussed above and in more detail below.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory; and
    one or more hardware processors coupled to the non-transitory memory and configured to read instructions from the non-transitory memory to cause the system to perform operations comprising:
        determining that a virtual object, from a plurality of virtual objects, is associated with a location of a first device and that a first user of the first device has been authorized to access the virtual object, wherein the virtual object is associated with a physical object and generated by a second user using a second device;
        determining that an image view is displayed on an interface of the first device;
        determining that the physical object is included within the image view;
        determining a total transaction amount between a first user account associated with the first user and a second user account associated with the second user based on one or more previous transactions between the first user account and the second user account;
        in response to determining that the physical object is included within the image view displayed on the interface of the first device, augmenting the image view by superimposing a graphical representation of the virtual object onto the image view based on a relative position of the first device with respect to a real-world location and an orientation associated with the virtual object, wherein the graphical representation includes a presentation of the total transaction amount;
        receiving, from the first device, an interaction with the virtual object via the interface of the first device;
        in response to the receiving the interaction with the virtual object via the interface of the first device, modifying a virtual representation of the virtual object being displayed on the second device, wherein the modifying is further based on a location of the second device; and
        transferring a monetary amount from the second user account to the first user account based on the interaction, wherein the monetary amount is added to the total transaction amount.

2. The system of claim 1, wherein the virtual object is configured to provide, via the interface of the first device, a presentation based on a detected event.

3. The system of claim 1, wherein the operations further comprise:
receiving, from the second device, a request to generate the virtual representation of the virtual object having a set of configurations representing at least the real-world location and the orientation associated with the virtual object; and
causing the virtual object to be generated based on the set of configurations.

4. The system of claim 3, wherein the operations further comprise:
determining the real-world location and the orientation associated with the virtual object based on location data and orientation data obtained from one or more sensors associated with the second device.

5. The system of claim 3, wherein the operations further comprise:
determining the real-world location and the orientation associated with the virtual object based on user input received from the second device.

6. The system of claim 1, wherein the operations further comprise:
linking the second user account associated with the second device and the physical object with the virtual object.

7. The system of claim 1, wherein the interaction comprises a gesture on the interface.

8. A method comprising:
determining, by one or more hardware processors, a location of a first device;
determining, by the one or more hardware processors, that a virtual object is associated with the location of the first device associated with a first user, wherein the virtual object is associated with a physical object and generated by a second device of a second user;
determining, by the one or more hardware processors, that an image view is displayed on an interface of the first device;
determining, by the one or more hardware processors, that the physical object is included within the image view;
determining, by the one or more hardware processors, a total transaction amount between a first user account associated with the first user and a second user account associated with the second user based on one or more previous transactions between the first user account and the second user account;
in response to determining that the physical object is included within the image view, augmenting, by the one or more hardware processors, the image view by superimposing a representation of the virtual object onto the image view based on a relative position of the first device with respect to a real-world location and an orientation associated the virtual object, wherein the representation of the virtual object comprises a presentation of the total transaction amount;
receiving, by the one or more hardware processors from the first device, an interaction with the virtual object via the interface provided on of the first device; and
in response to receiving the interaction with the virtual object via the interface of the first device, modifying, by the one or more hardware processors, a virtual representation of the virtual object being displayed on the second device, wherein the modifying is further based on a location of the second device; and transferring, by the one or more hardware processors, a monetary amount from the second user account to the first user account based on the interaction, wherein the monetary amount is added to the total transaction amount.

9. The method of claim 8, further comprising determining that the virtual object is accessible by the first device based on at least one of an identity of the user or an identity of the first device.

10. The method of claim 8, wherein the virtual object is associated with the monetary amount.

11. The method of claim 8, wherein the real-world location associated with the virtual object is a first real-world location, wherein the virtual object was moved from a second real-world location to the first real-world location based on a second interaction on the second device with the virtual object.

12. The method of claim 11, further comprising:
receiving, from the second device, a second interaction with the virtual object via a second interface of the second device; and
modifying a location attribute of the virtual object based on the second interaction.

13. The method of claim 12, wherein the location attribute of the virtual object is modified further based on a detected location of the second device.

14. A non-transitory machine-readable medium having stored thereon machine-readable instructions to cause a machine to perform operations comprising:
determining that a virtual object, from a plurality of virtual objects, is associated with a location of a first device associated with a first user, wherein the virtual object is associated with a physical object and generated by a second device of a second user;
determining that an image view is displayed on an interface of the first device;
determining that the physical object is included within the image view;
determining a total transaction amount between a first user account associated with the first user and a second user account associated with the second user based on one or more previous transactions between the first user account and the second user account;
in response to determining that the physical object is included in the image view, augmenting the image view by superimposing a graphical representation of the virtual object onto the image view based on a relative position of the first device with respect to a real-world location and an orientation associated the virtual object, wherein the graphical representation includes the total transaction amount;
receiving, from the first device, an interaction with the virtual object via the interface provided on the first device;
in response to the receiving the interaction with the virtual object via the interface provided on the first device, modifying a virtual representation of the virtual object being displayed on the second device, wherein the modifying is further based on a location of the second device; and
transferring a monetary amount from the second user account to the first user account based on the interaction, wherein the monetary amount is added to the total transaction amount.

15. The non-transitory machine-readable medium of claim 14, wherein the operations further comprise:

updating a location attribute of the virtual object based on a movement of the first device.

16. The non-transitory machine-readable medium of claim 14, wherein the operations further comprise:
linking the virtual object to the first device based on the interaction;
subsequent to linking the virtual object with the first device, receiving, from the first device, a second interaction with the virtual object via the interface of the first device;
in response to receiving the second interaction, linking the virtual object to the third device; and
transmitting, to the first device, a notification indicating an updated real-world location associated with the virtual object based on a movement of the third device.

17. The non-transitory machine-readable medium of claim 14, wherein the virtual object is configured to provide, via the interface of the first device, a presentation based on a detected event.

18. The non-transitory machine-readable medium of claim 17, wherein the presentation comprises at least one of a note, an animation, or a ticket.

19. The non-transitory machine-readable medium of claim 17, wherein the detected event comprises a real-world location associated with the virtual object matching a predetermined location.

20. The non-transitory machine-readable medium of claim 14, wherein the operations further comprise determining that the virtual object is accessible by the first device based on at least one of an identity of the user or an identity of the first device.

\* \* \* \* \*